(12) United States Patent
Jeong et al.

(10) Patent No.: US 8,620,324 B2
(45) Date of Patent: Dec. 31, 2013

(54) METHOD AND APPARATUS FOR DETERMINING HANDOVER IN MOBILE COMMUNICATION SYSTEM

(75) Inventors: Hong-Kyu Jeong, Seoul (KR); Byung-Suk Kim, Seoul (KR); Seong-Ryong Kang, Gyeonggi-do (KR); Dong-Sook Kim, Gyeonggi-do (KR); Chul-Ki Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 1 day.

(21) Appl. No.: 13/016,398

(22) Filed: Jan. 28, 2011

(65) Prior Publication Data

US 2011/0183672 A1   Jul. 28, 2011

(30) Foreign Application Priority Data

Jan. 28, 2010   (KR) .................. 10-2010-0007707

(51) Int. Cl.
*H04W 36/00*   (2009.01)

(52) U.S. Cl.
USPC ........... 455/436; 370/331; 370/332; 455/437; 455/438; 455/439; 455/440; 455/441

(58) Field of Classification Search
USPC .................. 370/331–332; 455/436–444
See application file for complete search history.

(56) References Cited

U.S. PATENT DOCUMENTS

| | | | |
|---|---|---|---|
| 7,898,948 B2 * | 3/2011 | DiGirolamo et al. ......... 370/230 |
| 2002/0160777 A1 * | 10/2002 | Takao et al. ................... 455/436 |
| 2002/0160783 A1 * | 10/2002 | Holtzman et al. ............. 455/452 |
| 2003/0185159 A1 * | 10/2003 | Seo et al. ....................... 370/278 |
| 2004/0022213 A1 * | 2/2004 | Choi et al. ..................... 370/332 |
| 2004/0121771 A1 * | 6/2004 | Song et al. ..................... 455/436 |
| 2008/0232323 A1 * | 9/2008 | Jeong et al. .................... 370/331 |
| 2008/0261599 A1 * | 10/2008 | Mohanty et al. .............. 455/436 |
| 2009/0245203 A1 * | 10/2009 | Pani et al. ...................... 370/331 |
| 2009/0323638 A1 * | 12/2009 | Catovic et al. ................ 370/331 |
| 2010/0222059 A1 * | 9/2010 | Pani et al. ...................... 455/436 |

* cited by examiner

*Primary Examiner* — Charles Shedrick
(74) *Attorney, Agent, or Firm* — The Farrell Law Firm, P.C.

(57) ABSTRACT

A method and an apparatus of a serving base station for determining handover of a terminal in a mobile communications system are provided, including determining whether a measurement report message is received from a User Equipment (UE); when receiving the measurement report message, determining whether a channel status value of the UE satisfies a preset condition during a certain time; and determining whether to hand over the UE according to the determination result.

12 Claims, 8 Drawing Sheets

METHOD AND APPARATUS FOR DETERMINING HANDOVER IN MOBILE COMMUNICATION SYSTEM

PRIORITY

The present application claims priority under 35 U.S.C. §119(a) to a Korean patent application filed in the Korean Intellectual Property Office on Jan. 28, 2010, and assigned Serial No. 10-2010-0007707, the entire disclosure of which is incorporated herein by reference.

BACKGROUND OF THE INVENTION

1. Field of the Invention

The present invention generally relates to a mobile communications system and, more particularly, to a method apparatus for determining handover by considering channel status of a terminal in a mobile communications system.

2. Description of the Related Art

In a mobile communications system, when a terminal migrates to a boundary region between cells, the terminal performs handover.

To perform the handover, the terminal determines whether a handover condition is satisfied by periodically measuring signals of a neighbor Base Station (BS). When the handover condition is satisfied, the terminal generates and transmits a measurement report message to its serving BS. The serving BS determines the handover of the terminal by referring to the measurement report message, and performs a procedure to hand the terminal over to a target BS. The handover condition signifies that a difference between a signal strength of the serving BS received at the terminal and a signal strength of the neighbor BS satisfies a hysteresis value during a Time To Trigger (TTT). The TTT and the hysteresis value are provided from the mobile communications system to the terminal and managed per BS.

FIG. 1 illustrates a handover process in a general mobile communications system. In FIG. 1, a User Equipment (UE) 100 transmits and receives packet data to and from a source Evolved Node B (eNB) 104 and a MME/S-GW 106 in step 110, and measures Reference Signal Receive Power (RSRP) values of the source eNB 104 and a neighbor eNB in step 112. When the RSRP value of the source eNB 104 is lower than a threshold, the UE 100 measures the RSRP value of the neighbor eNB 102, compares the measured RSRP value with the RSRP value of the source eNB 104, determines whether the RSRP difference is greater than the hysteresis value, and determines whether this state is maintained for the TTT. When this state is sustained for the TTT, the UE 100 generates and sends the measurement report message to the source eNB 104 in step 114.

The source eNB 104 determines the neighbor eNB 102 as a handover target eNB 102 of the UE 100 in step 116, sends a handover request message to the target eNB 102 in step 118, determines a resource of the target eNB 102 in step 120, and receives a handover request response message in step 122. The source eNB 104 then sends an Radio Resource Control (RRC) connection reconfiguration message instructing the handover to the UE 100 in step 124.

The UE 100 hands over to the target eNB 102 and transmits and receives packet data via the target eNB 102.

As explained above, the conventional mobile communications system determines whether to hand over depending on whether the RSRP value difference of the source eNB and the neighbor eNB meets the hysteresis value during the TTT. However, this method cannot select an optimum handover time and may thus cause a ping-pong situation in which the UE frequently hands over, which can delay the handover and waste radio resources, incur additional delay due to retransmission, and can lose data. For example, if the UE is travelling slowly and the TTT and the hysteresis value are small, handovers can frequently occur. When the UE travels fast and the TTT and the hysteresis value are great, the handover may not proceed at the necessary time.

SUMMARY OF THE INVENTION

To address the above-discussed deficiencies of the prior art, it is an aspect of the present invention to provide a method and an apparatus for adaptively determining handover according to channel status of a UE in a mobile communications system.

Another aspect of the present invention is to provide a method and an apparatus of a source eNB for determining handover using a Modulation and Coding Scheme (MCS) level of a user equipment in a mobile communications system.

Yet another aspect of the present invention is to provide a method and an apparatus of a source eNB for determining handover using a BLock Error Rate (BLER) of a user equipment in a mobile communications system.

According to one aspect of the present invention, a method of a source eNB for determining handover of a User Equipment (UE) in a mobile communications system, includes determining whether a measurement report message is received from the UE; when receiving the measurement report message, determining whether a channel status value of the UE satisfies a preset condition during a certain time; and determining whether to hand over the UE according to the determination result.

According to another aspect of the present invention, a method of a UE handover in a mobile communications system includes receiving from a source eNB a message requesting to send a measurement report message; measuring Reference Signal Receive Powers (RSRPs) of the source eNB and a neighbor eNB; and generating the measurement report message based on the measurement result and sending the measurement report message to the source eNB.

According to yet another aspect of the present invention, an apparatus of a source eNB for determining handover of a UE in a mobile communications system includes a transceiver for transmitting and receiving signals to and from the UE; and a controller for determining whether a measurement report message is received from the UE, when receiving the measurement report message, determining whether a channel status value of the UE satisfies a preset condition during a certain time, and determining whether to hand over the UE according to the determination result.

According to still another aspect of the present invention, an apparatus of a UE for handing over in a mobile communications system includes a transceiver for transmitting and receiving signals to and an eNB; and a controller for, when receiving from a source eNB a message requesting to send a measurement report message through the transceiver, controlling to measure RSRPs of the source eNB and a neighbor eNB, to generate the measurement report message based on the measurement result, and to send the measurement report message to the source eNB.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE INVENTION

Figure 1:
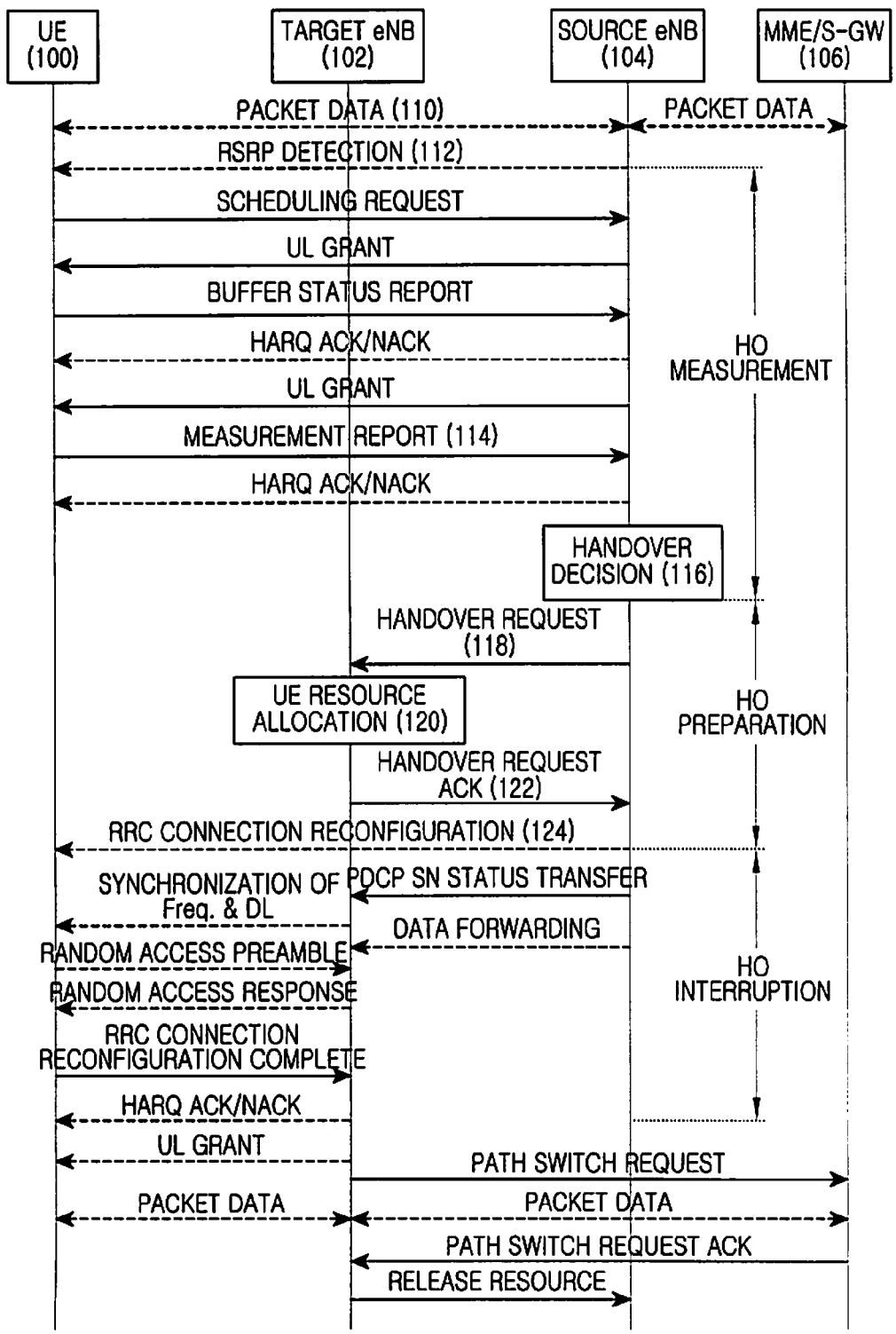
FIG. 1 illustrates a handover process in a general mobile communications system.

Hereinafter, embodiments of the present invention will be described with reference to the accompanying drawings. In the following description, the same elements will be designated by the same reference numerals although they are shown in different drawings.

Embodiments of the present invention provide a method and apparatus for adaptively determining handover according to channel status of a User Equipment (UE) in a mobile communications system.

Information indicating the channel status of the UE uses a Modulation and Coding Scheme (MCS) level and a BLock Error Rate (BLER). The present invention is equally applicable to Channel Quality Indicator (CQI) or Packet Error Rate (PER) indicating the channel status of the UE.

Figure 2A:
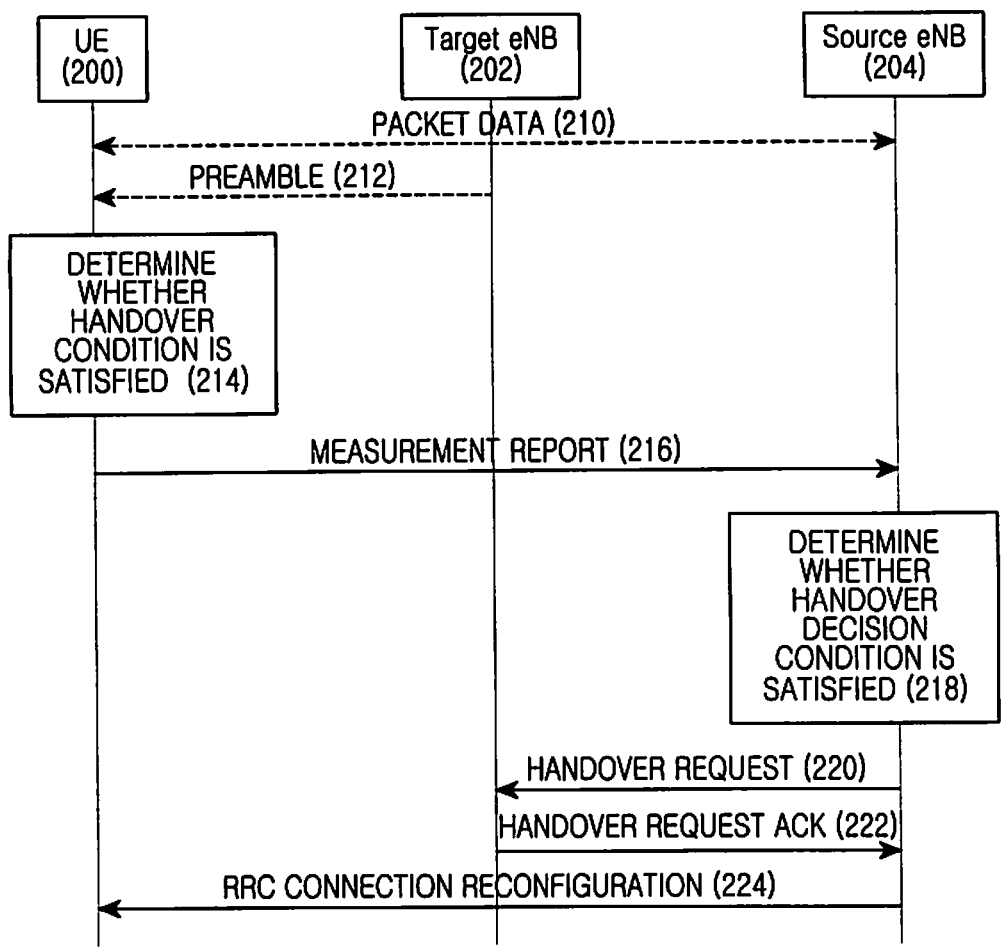
FIGS. 2A and 2B illustrate a handover decision process in a mobile communications system according to an embodiment of the present invention.
Figure 2B:
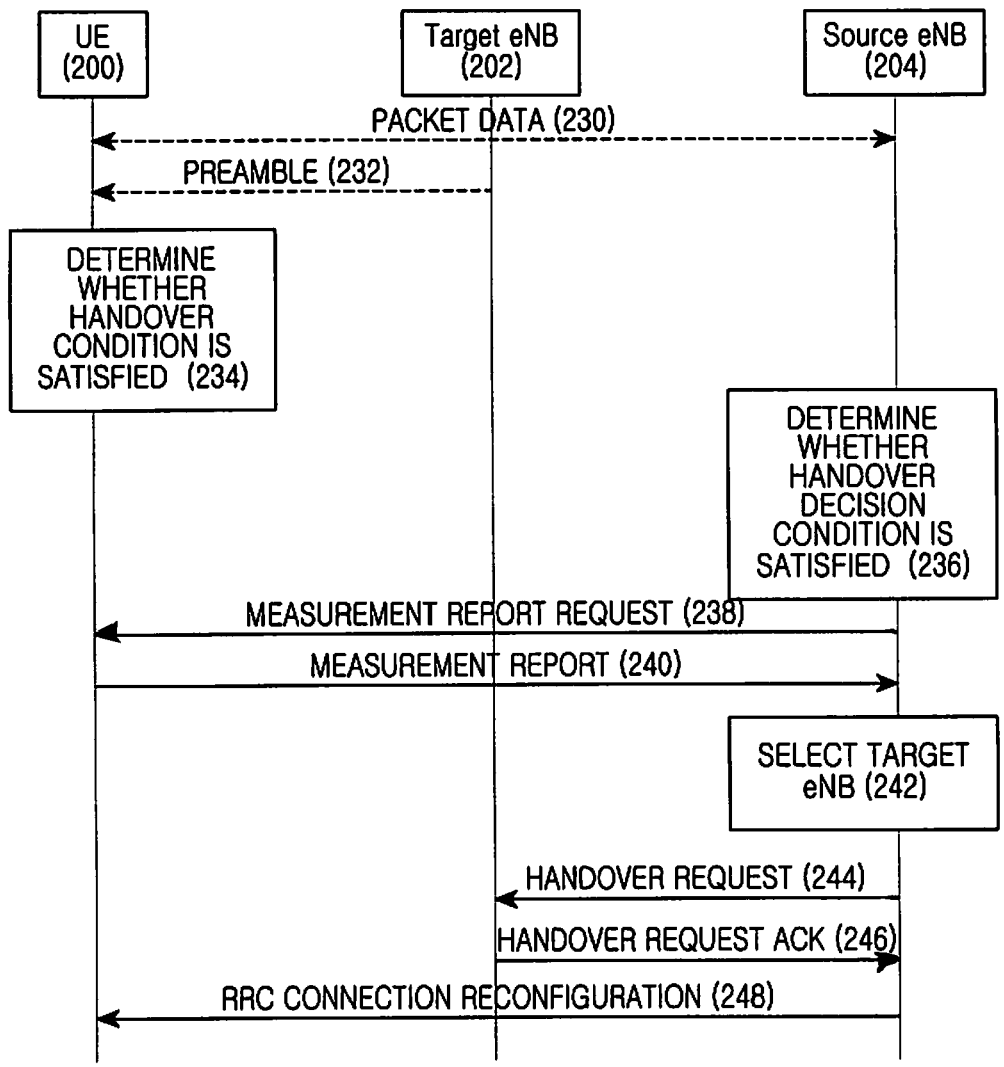

FIGS. 2A and 2B depict a handover decision process in a mobile communications system according to an embodiment of the present invention.

FIG. 2A shows the handover decision process when an eNB receives a measurement report message satisfying a handover condition in the mobile communications system, according to an embodiment of the present invention.

The UE 200 transmits and receives packet data to and from a source eNB 204 in step 210, and receives a preamble signal from a neighbor eNB 202 in step 212.

In step 214, the UE 200 measures the Reference Signal Receive Power (RSRP) of the source eNB 204 and the neighbor eNB 202 and determines whether the RSRPs of the source eNB 204 and the neighbor eNB 202 meet the handover condition. That is, the UE 200 determines whether the RSRP of the neighbor eNB is greater than the RSRP of the source eNB by more than a preset hysteresis value and whether this state constant throughout a Time To Trigger (TTT). When the handover condition is satisfied, the UE 200 generates the measurement report message including the information of the neighbor eNB 202 and sends the message to the source eNB 204 in step 216.

In step 218, the source eNB 204, receiving the measurement report message from the UE, determines whether the channel status of the UE 200 satisfies a handover decision condition. More specifically, the source eNB 204 determines whether the MCS of the UE has fallen below a first threshold during a first threshold time, or whether the BLER of the UE has exceeded a second threshold during a second threshold time. When the handover decision condition is satisfied, the source eNB 204 selects the neighbor eNB 202 as a handover target eNB of the UE 200. The first threshold, the second threshold, the first threshold time, and the second threshold time can be set and modified by an operator depending to the cell environment.

The source eNB 204 then sends a handover request message to the target eNB 202 in step 220, determines a resource of the UE 200 by receiving a handover request response message from the target eNB 202 in step 222, and sends an RRC connection reconfiguration message instructing the handover to the target eNB 202, to the UE 200 in step 224.

FIG. 2B illustrates the handover decision process when the eNB does not receive a measurement report message satisfying the handover condition in the mobile communications system according to an embodiment of the present invention.

The UE 200 transmits and receives packet data to and from the source eNB 204 in step 230, and receives a preamble signal of the neighbor eNB 202 in step 232.

In step 234, the UE 200 measures the RSRPs of the source eNB 204 and the neighbor eNB 202 and determines whether the RSRPs of the source eNB 204 and the neighbor eNB 202 meet the handover condition. That is, the UE 200 determines whether the RSRP of the neighbor eNB is greater than the RSRP of the source eNB by more than the preset hysteresis value and whether this state is constant throughout the TTT. When the handover condition is not satisfied, the UE 200 repeats steps 230 through 234 until the handover condition is satisfied or a measurement report request message is received from the source eNB 204.

While not receiving the measurement report message satisfying the handover condition from the UE 200, the source eNB 204 determines whether the channel status of the UE 200 meets the handover decision condition in step 236. Specifically, the source eNB 204 determines whether the MCS of the UE falls below the first threshold during the first threshold time, or whether the BLER of the UE exceeds the second threshold during the second threshold time. When the handover condition is satisfied, the source eNB 204 sends a message requesting to send the measurement report message to the UE 200 in step 238. The source eNB can request the UE 200 to send the measurement report message using the RRC connection reconfiguration message.

The UE 200 receiving the message requesting to send the measurement report message generates and sends the measurement report message to the source eNB 204 in step 240. Thus, the UE 200 may generate and send the measurement report message including the RSRP and identification information of the source eNB 204 and neighbor eNBs, select only neighbor eNBs having the RSRP greater than the RSRP of the source eNB 204 by more than a minimum threshold among the neighbor eNBs, and send the measurement report message including only information of the corresponding neighbor eNBs. The minimum threshold can be set and altered by the operator according to the cell environment.

In step 242, based on the measurement report message, the source eNB 204 determines the neighbor eNB 202 having the RSRP greater than the RSRP of the source eNB 204 by more than the minimum threshold as the handover target eNB of the UE 200. The source eNB 204 then sends a handover request message to the target eNB 202 in step 244, determines the resource of the UE 200 by receiving a handover request response message from the target eNB 202 in step 246, and sends to the UE 200 the RRC connection reconfiguration message instructing the handover to the target eNB 202 in step 248.

Figure 3:
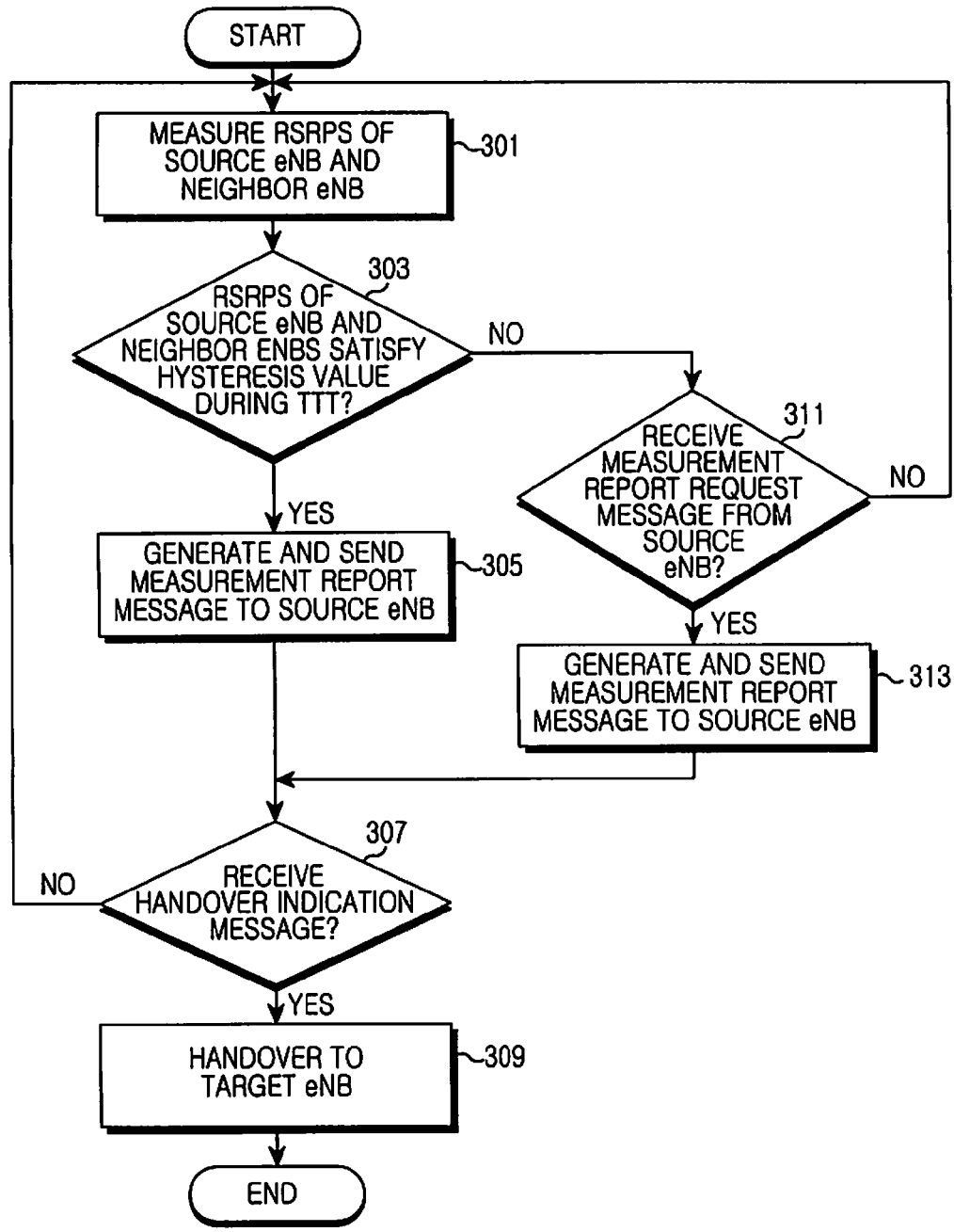
FIG. 3 illustrates the operations of a User Equipment (UE) for handover in the mobile communications system, according to an embodiment of the present invention.

FIG. 3 illustrates operations of the UE for the handover in the mobile communications system according to an embodiment of the present invention.

The UE measures the RSRPs of the source eNB and the neighbor eNBs in step 301, and determines whether the RSRPs of the source eNB and the neighbor eNB satisfy the hysteresis value during the TTT in step 303. That is, the UE determines whether the RSRP of the neighbor eNB exceeds the RSRP of the source eNB by more than the hysteresis value during the TTT.

When the RSRPs of the source eNB and the neighbor eNB satisfy the hysteresis value during the TTT, the UE generates and sends the measurement report message to the source eNB in step 305.

The UE then determines whether a handover indication message is received in step 307. If the handover indication message has not been received, then the UE returns to step 301.

By contrast, if the handover indication message is received, the UE hands over to the handover target eNB indicated by the handover indication message in step 309, and finishes the process.

When the RSRPs of the source eNB and the neighbor eNB do not satisfy the hysteresis value during the TTT, the UE determines whether the message requesting to send the measurement report message has been received from the source eNB in step 311. If the message requesting to send the measurement report message has not been received, the UE goes back to step 301.

Upon receiving the message requesting to send the measurement report message, the UE generates and sends the measurement report message to the source eNB in step 313 and goes to step 307. The UE may generate and send the measurement report message including the RSRP and the identification information of the source eNB and the neighbor eNBs, and may select only neighbor eNBs having an RSRP greater than the RSRP of the source eNB 204 by more than the minimum threshold among the neighbor eNBs and send the measurement report message including only information of the corresponding neighbor eNBs. The minimum threshold can be set and altered by the operator according to the cell environment.

Figure 4:
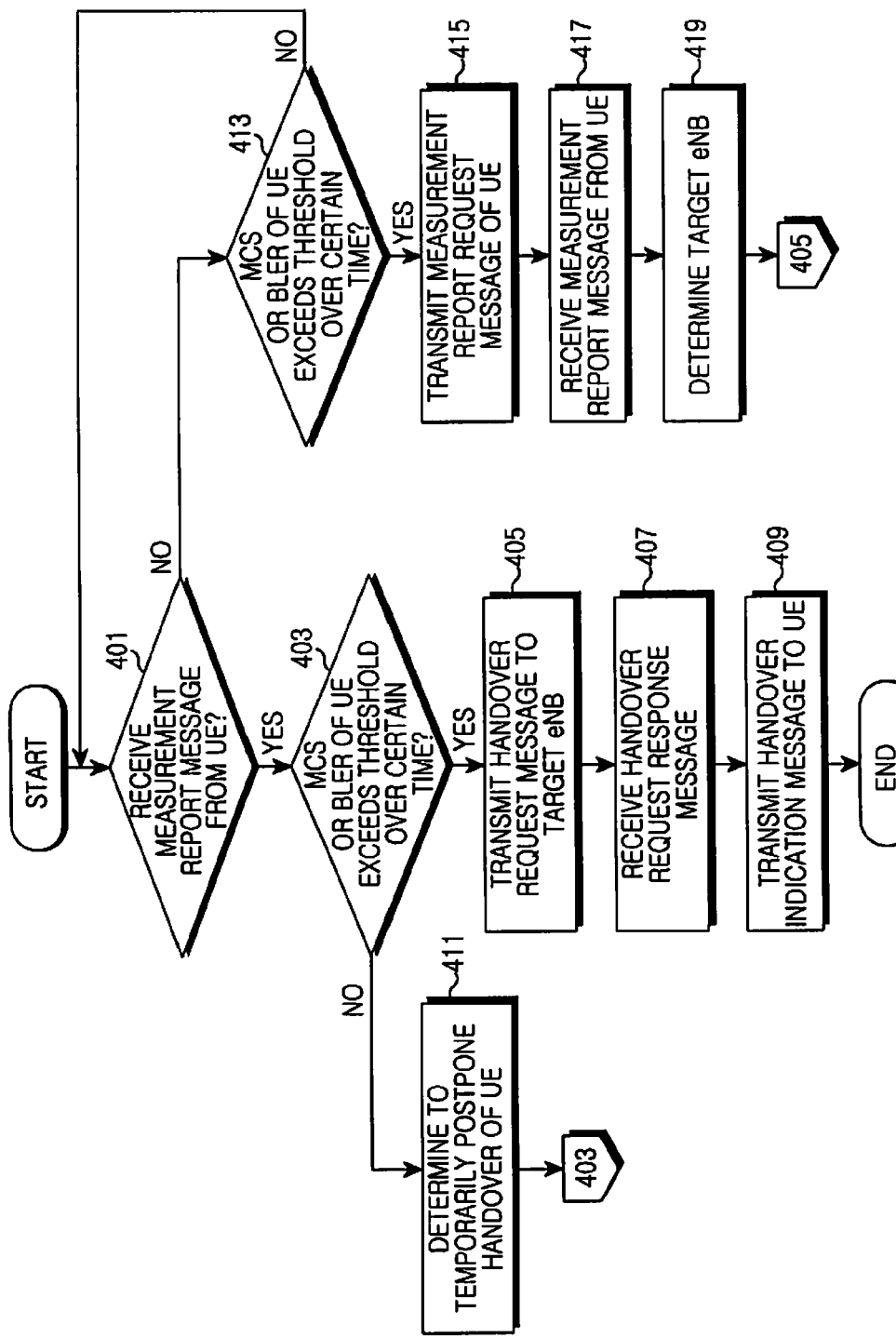
FIG. 4 illustrates operations of an eNB for determining the handover of the UE in the mobile communications system, according to an embodiment of the present invention.

FIG. 4 illustrates operations of the eNB for determining the handover of the UE in the mobile communications system according to an embodiment of the present invention.

In step 401, the eNB determines whether the measurement report message satisfying the TTT and the hysteresis value has been received from the UE. Upon receiving the measurement report message, the eNB determines whether the MCS of the UE falls below the first threshold during the first threshold time or the BLER of the UE exceeds the second threshold over the second threshold time in step 403.

When the MCS of the UE falls below the first threshold during the first threshold time or the BLER of the UE exceeds the second threshold over the second threshold time, the source eNB determines the handover because of the poor channel status of the UE, determines the target eNB based on the measurement report message, and sends a handover request message to the target eNB in step 405.

The source eNB then receives the handover request response message in step 407, sends the handover indication message to the UE in step 409, and finishes the process.

When the MCS of the UE does not fall below the first threshold during the first threshold time or the BLER of the UE does not exceed the second threshold over the second threshold time, the source eNB temporarily postpones the handover because of the good channel status of the UE in step 411, and then goes back to step 403.

If the measurement report message meeting the TTT and the hysteresis value from the UE in step 401, the eNB determines whether the MCS of the UE has fallen below the first threshold during the first threshold time or the BLER of the UE has exceeded the second threshold over the second threshold time in step 413.

When the MCS of the UE falls below the first threshold during the first threshold time or the BLER of the UE exceeds the second threshold over the second threshold time in step 413, the source eNB sends the message requesting to send the measurement report message to the UE in step 415, and receives the measurement report message from the UE in step 417.

The source eNB then determines the target eNB based on the measurement report message in step 419, and returns to step 405. The target eNB can be determined to one of the neighbor eNBs of the UE having the RSRP greater than the RSRP of the source eNB by more than the minimum threshold.

When the MCS of the UE does not fall below the first threshold during the first threshold time or the BLER of the UE does not exceed the second threshold over the second threshold time in step 413, the source eNB goes back to step 401.

Figure 5:
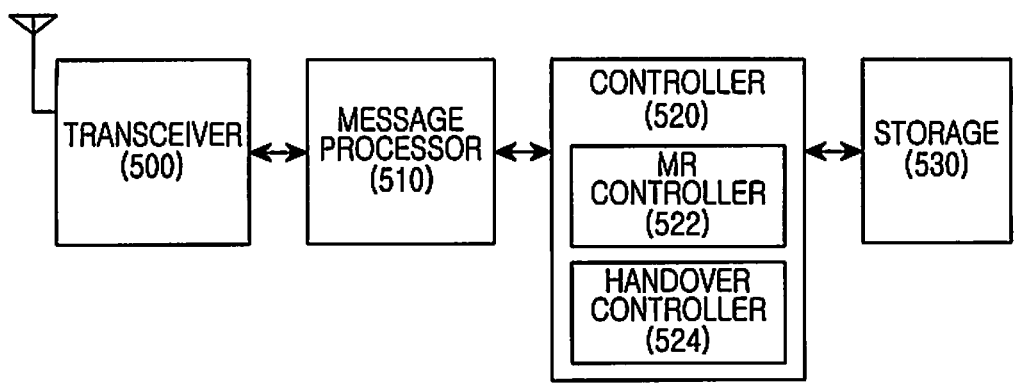
FIG. 5 illustrates the UE in the mobile communications system, according to an embodiment of the present invention.

FIG. 5 is a block diagram of the UE in the mobile communications system according to an embodiment of the present invention.

The UE of FIG. 5 includes a transceiver 500, a message processor 510, a controller 520, and a storage 530. The controller 520 includes an MR controller 522 and a handover controller 524.

The transceiver 500 processes the signals transmitted and received over an antenna. The transceiver 500 processes a radio frequency signal received from the eNB via the antenna in the baseband and provides the processed signal to the message processor 520. The transceiver 500 processes a baseband signal fed from the message processor 510 in the radio frequency and transmits the processed signal to the corresponding eNB over the antenna.

The message processor 510 analyzes the message input from the transceiver 500 and provides the analysis result to the controller 520. The message processor 510 generates the message based on various information provided from the controller 520 and outputs the message to the transceiver 500. For example, the message processor 510 receives information of the neighbor eNB (e.g., neighbor eNB identification information, RSRP) which is the handover candidate, from the controller 520, generates the measurement report message including this information, and provides the generated measurement report message to the transceiver 500.

The controller 520 controls and processes the operations of the UE. The controller 520 including the MR controller 522 and the handover controller 524, determines whether the handover condition is satisfied by measuring the RSRPs of the source eNB and the neighbor eNB, and sends the measurement report message to the source eNB according to whether the handover condition is satisfied, to control and process the function for handing over to the neighbor eNB.

The MR controller 522 controls the transceiver 500 to measure the RSRPs of the source eNB and the neighbor eNBs, and determines whether the RSRP of the neighbor eNB is greater than the RSRP of the source eNB by more than the preset hysteresis value during the preset TTT. When the RSRP of the neighbor eNB is greater than the RSRP of the source eNB by more than the preset hysteresis value during the TTT, the MR controller 522 controls the message processor 510 to generate the measurement report message. The measurement report message can include the information of the neighbor eNBs (e.g., neighbor eNB identification information, RSRP value), which are the handover candidate eNBs of the UE. When receiving the message requesting to send the measurement report message from the source eNB, the MR controller 522 measures the RSRPs of the source eNB and the neighbor eNBs and controls the message processor 510 to generate the measurement report message. Thus, the measurement report message can include information relating to the neighbor eNBs having the RSRP greater than the RSRP of the source eNB by more than the minimum threshold, among the neighbor eNBs.

When receiving the message indicating the handover from the source eNB, the handover controller 524 identifies the target eNB based on the received handover indication message, and controls and processes to hand over to the target eNB.

The storage 530 stores various programs and data for the operations of the UE, and contains the TTT, the hysteresis value, and the minimum RSRP value.

Figure 6:
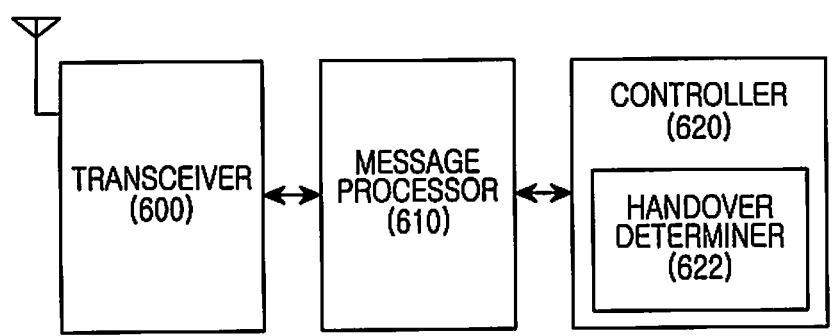
FIG. 6 illustrates the eNB in the mobile communications system, according to an embodiment of the present invention.

FIG. 6 is a block diagram of the eNB in the mobile communications system according to an embodiment of the present invention.

The eNB of FIG. 6 includes a transceiver 600, a message processor 610, and a controller 620. The controller 620 includes a handover determiner 622.

The transceiver 600 processes the signals transmitted and received over an antenna. The transceiver 600 processes a radio frequency signal received from the UE via the antenna in the baseband and provides the processed signal to the message processor 610. The transceiver 600 processes a baseband signal received from the message processor 610 in the radio frequency and transmits the processed signal to the corresponding UE over the antenna.

The message processor 610 analyzes the message input from the transceiver 600 and provides the analysis result to the controller 620. The message processor 610 generates the message based on various information fed from the controller 620 and outputs the message to the transceiver 600. For example, the message processor 610 generates the message requesting the UE to transmit the measurement report message, and provides the generated message to the transceiver 600 under the control of the controller 620.

The controller 620 controls and processes the operations of the eNB. The controller 620 including the handover determiner 622 which controls and processes to determine whether to hand over according to the MCS or the BLER of the UE. The MCS or the BLER can be obtained in a Media Access Control (MAC) layer.

When receiving the measurement report message satisfying the TTT and the hysteresis value from the UE, the handover determiner 622 determines whether to perform the handover of the corresponding UE according to the MCS or the BLER of the corresponding UE. Specifically, the handover determiner 622 determines whether the MCS of the UE falls below the first threshold during the first threshold time or the BLER of the UE exceeds the second threshold over the second threshold time. When the MCS of the UE falls below the first threshold during the first threshold time or the BLER of the UE exceeds the second threshold over the second threshold time, the handover determiner 622 decides to hand over the UE. When the MCS of the UE does not fall below the first threshold during the first threshold time or the BLER of the UE does not exceed the second threshold over the second threshold time, the handover determiner 622 postpones the handover of the UE.

When the measurement report message satisfying the TTT and the hysteresis value is not received from the UE, the handover determiner 622 determines whether the MCS of the UE has fallen below the first threshold during the first threshold time or the BLER of the UE has exceeded the second threshold over the second threshold time. When such state occurs, the handover determiner 622 controls and processes to request the UE to transmit the measurement report message, receives the measurement report message from the UE, determines the handover target eNB of the UE, and then performs processing to hand over the UE.

Figure 7:
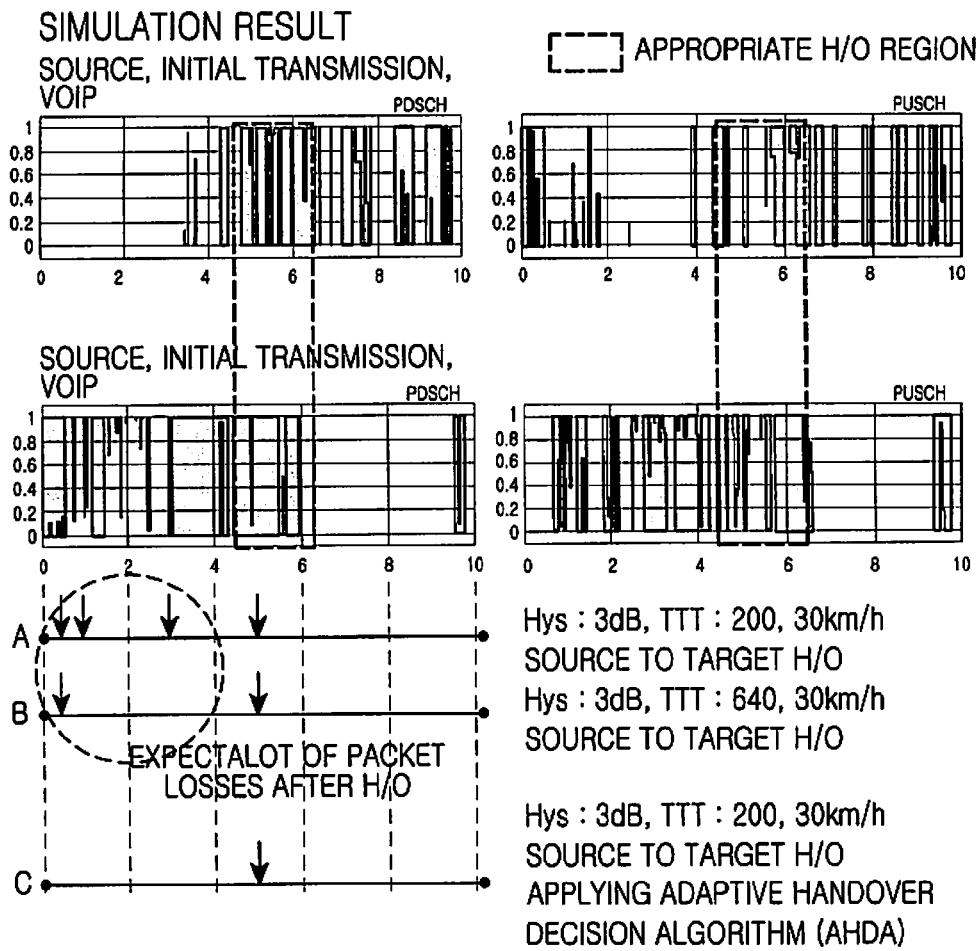
FIG. 7 illustrates experiment results indicating the handover time of the UE in the conventional technique and in the mobile communications system, according to an embodiment of the present invention.

FIG. 7 illustrates experimental results indicating the handover time of the UE in the conventional technique and in the mobile communications system according to an embodiment of the present invention. The horizontal axis of the graph indicates a Transmission Time Interval (TTI) that signifies the channel status between the source eNB and the UE, and the vertical axis indicates a packet error rate that signifies the channel status between the target eNB and the UE.

In FIG. 7, A and B indicate the time and number of the UE handovers when the handover is determined using only the hysteresis value and the TTT in the conventional technique, and C indicates the time and number of the UE handovers when the handover is determined using the MCS or the BLER indicating the state of the UE in addition to the hysteresis value and the TTT according to the present invention.

A and B of the conventional technique exhibit the frequent handovers in an inappropriate handover region, whereas C. according to the present invention. performs the handover only in the region requiring the handover.

Thus, while the UE generates the measurement report message according to whether the hysteresis value and the TTT are satisfied and transmits the generated measurement report message to the eNB, the present invention is also applicable in a case where the UE periodically transmits the measurement report message and the eNB determines based on the received measurement report message whether the hysteresis value and the TTT are satisfied.

As set forth above, the handover is determined using the information indicating the channel status of the UE in addition to the hysteresis value and the TTT in the mobile communications system. When the channel status of the source eNB and the UE is poor and the hysteresis value and the TTT are not satisfied, the handover of the UE is performed. When the channel status of the source eNB and the UE is good and the hysteresis value and the TTT are satisfied, the handover is not performed. Therefore, it is possible to avoid the "ping-pong" situation of frequent handovers and to prevent the waste of resource and the delay extension.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of a source Evolved Node B (eNB) for determining handover of a User Equipment (UE) in a mobile communications system, comprising:
   determining whether a measurement report message is received from the UE;
   when receiving the measurement report message, monitoring a channel status value of the UE during a certain time;

identifying whether the channel status of the UE satisfies a preset condition during the certain time, based on the monitoring; and determining whether to hand over the UE, based on whether the channel status of the UE satisfies the preset condition during the certain time, wherein the channel status value of the UE comprises at least one of a Modulation and Coding Scheme (MCS), a Block Error Rate (BLER), and a Packet Error Rate (PER).

2. The method of claim 1, wherein determining whether the measurement report message is received from the UE comprises:

determining whether the measurement report message is received with respect to a neighbor eNB which satisfies a preset Time To Trigger (TTT) and a hysteresis value.

3. The method of claim 1, wherein the channel status value of the UE further comprises, a Channel Quality Indicator (CQI).

4. The method of claim 1, wherein determining whether to hand over the UE according to the determination result comprises:

when the condition is satisfied, determining a handover target eNB of the UE and performing a handover; and when the condition is not satisfied, postponing the handover of the UE until the channel status value of the UE satisfies the preset condition during the certain time.

5. The method of claim 1, further comprising:

when the measurement report message is not received, determining whether the channel status value of the UE satisfies the preset condition during the certain time;

when the condition is satisfied, requesting the UE to transmit a measurement report message;

receiving the measurement report message from the UE; and determining a handover target eNB of the UE based on the measurement report message and performing a handover.

6. The method of claim 5, wherein determining the handover target eNB of the UE based on the measurement report message comprises:

determining a neighbor eNB having a Reference Signal Receive Power (RSRP) greater than the RSRP of the source eNB by more than a threshold.

7. An apparatus of a source Evolved Node B (eNB) for determining handover of a User Equipment (UE) in a mobile communications system, comprising:

a transceiver for transmitting and receiving signals to and from the UE; and a controller for determining whether a measurement report message is received from the UE, when receiving the measurement report message, monitoring a channel status value of the UE during a certain time, identifying whether the channel status of the UE satisfies a preset condition during the certain time, based on the monitoring, and determining whether to hand over the UE, based on whether the channel status of the UE satisfies the preset condition during the certain time, wherein the channel status value of the UE comprises at least one of a Modulation and Coding Scheme (MCS), a Block Error Rate (BLER), and a Packet Error Rate (PER).

8. The apparatus of claim 7, wherein the controller determines whether the measurement report message is received with respect to a neighbor eNB, which satisfies a preset Time To Trigger (TTT) and a hysteresis value.

9. The apparatus of claim 7, wherein the channel status value of the UE further comprises a Channel Quality Indicator (CQI).

10. The apparatus of claim 7, wherein, when the condition is satisfied, the controller determines a handover target eNB of the UE and performs a handover, and when the condition is not satisfied, the controller postpones the handover of the UE until the channel status value of the UE satisfies the preset condition during the certain time.

11. The apparatus of claim 7, wherein, when the measurement report message is not received, the controller determines whether the channel status value of the UE satisfies the preset condition during the certain time, when the condition is satisfied, controls the transceiver to request the UE to transmit a measurement report message, and determines a handover target eNB of the UE based on the measurement report message received as requested.

12. The apparatus of claim 11, wherein, based on the measurement report message received as requested, the controller determines a neighbor eNB, among neighbor eNBs of the UE, having a Reference Signal Receive Power (RSRP) greater than the RSRP of a source eNB by more than a threshold.

* * * * *